(12) United States Patent
Hayashi (10) Patent No.: US 6,882,754 B2
(45) Date of Patent: Apr. 19, 2005

(54) IMAGE SIGNAL PROCESSOR WITH ADAPTIVE NOISE REDUCTION AND AN IMAGE SIGNAL PROCESSING METHOD THEREFOR

(75) Inventor: Kenkichi Hayashi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 569 days.

(21) Appl. No.: 09/883,217

(22) Filed: Jun. 19, 2001

(65) Prior Publication Data

US 2001/0055428 A1 Dec. 27, 2001

(30) Foreign Application Priority Data

Jun. 21, 2000 (JP) ........................................ 2000-191068

(51) Int. Cl.$^7$ .............................. G06K 9/40; G04N 5/21
(52) U.S. Cl. ...................................... 382/275; 382/607
(58) Field of Search ................................ 382/254, 274, 382/260–264, 275, 279, 298–300, 270, 272; 348/272–273, 345, 607, 622, 229.1

(56) References Cited

U.S. PATENT DOCUMENTS

| | | | | |
|---|---|---|---|---|
| 4,754,323 A | * | 6/1988 | Kaji et al. ................... | 348/256 |
| 5,382,976 A | * | 1/1995 | Hibbard ....................... | 348/273 |
| 5,596,367 A | * | 1/1997 | Hamilton et al. ........... | 348/272 |
| 5,638,119 A | * | 6/1997 | Cornuejols ................ | 348/229.1 |
| 5,828,793 A | * | 10/1998 | Mann .......................... | 382/284 |
| 5,842,059 A | * | 11/1998 | Suda .......................... | 396/101 |
| 5,999,215 A | * | 12/1999 | Tamura ...................... | 348/345 |
| 6,574,363 B1 | * | 6/2003 | Classen et al. ............. | 382/165 |
| 6,654,510 B1 | * | 11/2003 | Kawabe ...................... | 382/298 |

FOREIGN PATENT DOCUMENTS

JP  4-235472  8/1992  .......... H04N/5/335

* cited by examiner

Primary Examiner—Kanjibhai Patel
(74) Attorney, Agent, or Firm—Sughrue Mion, PLLC (57) ABSTRACT

An image signal processing device includes a signal processing circuit for executing signal processing for correction and recording on image data representative of an input image. Also, the signal processing circuit executes noise reduction on the individual image data in accordance with image inputting conditions and/or a pixel level. In the signal processing circuit, a threshold generating circuit generates a threshold by taking account of the image inputting conditions and/or a pixel level. During noise reduction, a noise reducing circuit produces a difference in level between the subject pixel data whose noise is to be detected and the mean value of the subject pixel data and pixel data around the subject pixel. The noise reducing circuit then selects either one of the subject pixel data and mean value in accordance with the difference and threshold.

25 Claims, 8 Drawing Sheets

IMAGE SIGNAL PROCESSOR WITH ADAPTIVE NOISE REDUCTION AND AN IMAGE SIGNAL PROCESSING METHOD THEREFOR

BACKGROUND OF THE INVENTION

1. Field of the Invention

The present invention relates to an image signal processing device and an image signal processing method therefor. The present invention is advantageously applicable to, e.g., noise reduction for a solid-state image pickup apparatus, digital camera, image capturing apparatus or similar apparatus dealing with image data.

2. Description of the Background Art

Today, a digital camera, for example, is loaded with a solid-state image sensor having high resolution, i.e., a great number of pixels generally referred to as megapixel. One of the problems with the megapixel digital camera is that the photosensitive area and therefore sensitivity of the individual cells is smaller, causing much random noise to be involved in an image picked up.

It is a common practice with the digital camera to execute noise reduction by using a low-pass filter. Japanese patent laid-open publication No. 235472/1992, for example, discloses an image pickup apparatus using median filter means for noise reduction. A recursive noise reducer is another conventional implementation for noise reduction. The recursive noise reducer includes a memory capable of storing more than one frame of image data. Image signals representative of one and the same scene are cumulatively stored into the memory so as to produce mean values for the pixels to thereby reduce noise.

The noise reduction by filtering, however, has a problem that the filtering lowers, e.g., the resolution of an image when constantly applied to the image, thereby degrading image quality. Further, while the filtering effects unconditional noise reduction, a particular filter must be assigned to each scene to be picked up or each shooting mode, i.e., each amount of noise. Mounting a plurality of filters on a digital camera is not practical.

The recursive noise reducer using an averaging method is effective only if a scene being picked up does not vary over the whole image capturing time. This limits the range of scenes to which the recursive noise reducer is applicable. Moreover, the memory for storing a plurality of images, coupled with a long shooting time ascribable to repeated pickup, critically impairs the function of the digital camera.

On the other hand, when a scene with a low signal level, e.g., a night scene is picked up, the digital camera increases sensitivity or otherwise corrects gain at the time of signal processing. The gain correction, however, amplifies noise together with the level of an image signal. Specifically, signal processing customary with, e.g., a digital camera generally includes nonlinear gamma correction for correcting the tonality of an image to be output. The gamma correction corrects gain more in a low luminance range than in a high luminance range. As a result, noise is enhanced at low luminance levels. In this manner, noise is dependent on shooting conditions and pixel level.

SUMMARY OF THE INVENTION

It is an object of the present invention to provide an image signal processing device capable of adequately reducing noise in accordance with shooting conditions and signal level, and an image signal processing method therefor.

In accordance with the present invention, an image signal processing device executes signal processing on image data representative of an input image. The device includes a signal processing circuit for executing signal processing on the image data for correction and recording and executing noise reduction on the individual image data in accordance with at least one of image inputting conditions and a pixel level. The signal processing circuit includes a threshold generating circuit for generating a threshold by taking account of at least one of the image inputting conditions and a pixel level. A noise reducing circuit produces, during noise reduction, a difference in level between a subject pixel data whose noise is to be detected and a mean value of the subject pixel data and pixel data around it. The noise reducing circuit then selects either one of the subject pixel data and mean value in accordance with the difference and threshold.

Also, in accordance with the present invention, a method of processing image data representative of an input image to thereby generate an image begins a step of collecting image inputting conditions under which the image is input. Subsequently, a threshold for determining, based on the image inputting conditions, whether or not to use subject pixel data to which noise reduction is to be applied is calculated. A mean value of the level of the subject pixel data and the levels of pixel data around it is calculated. A difference between the level of the subject pixel data and the mean value is produced. Thereafter, the difference and the threshold are compared to select either one of the subject pixel data and mean value.

BRIEF DESCRIPTION OF THE DRAWINGS

The objects and features of the present invention will become more apparent from consideration of the following detailed description taken in conjunction with the accompanying drawings in which:

FIG. 1 shows how FIGS. 1A and 1B are combined;

DESCRIPTION OF THE PREFERRED EMBODIMENTS

Figure 1A:
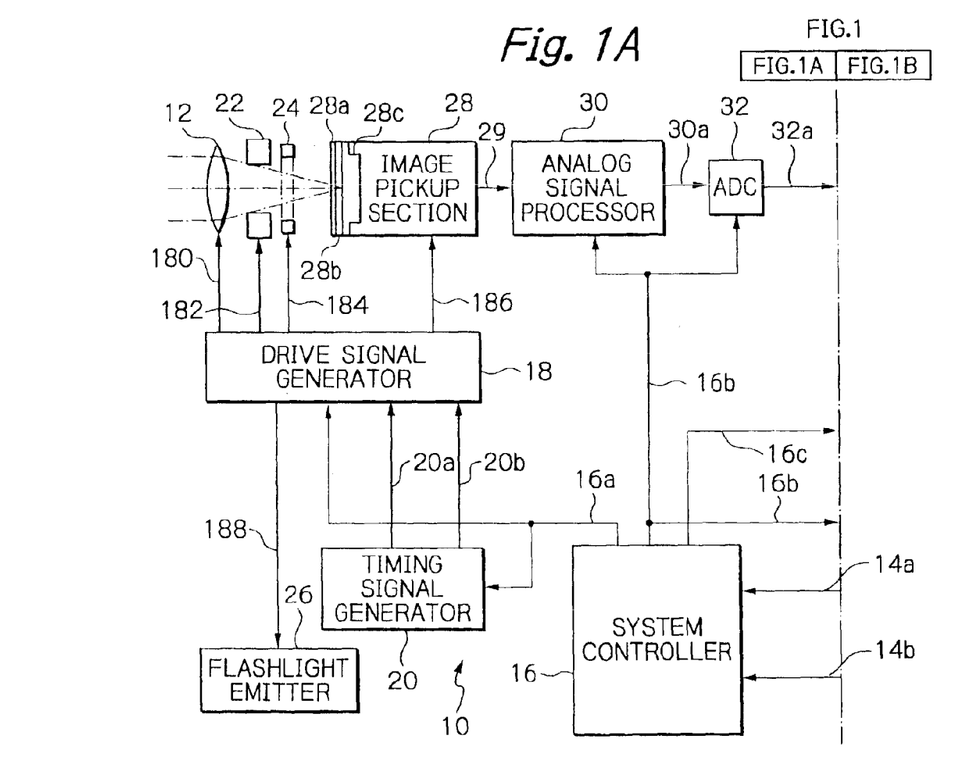
FIGS. 1A and 1B are schematic block diagrams showing a digital camera to which an image signals processing device embodying the present invention is applied.
Figure 1B:
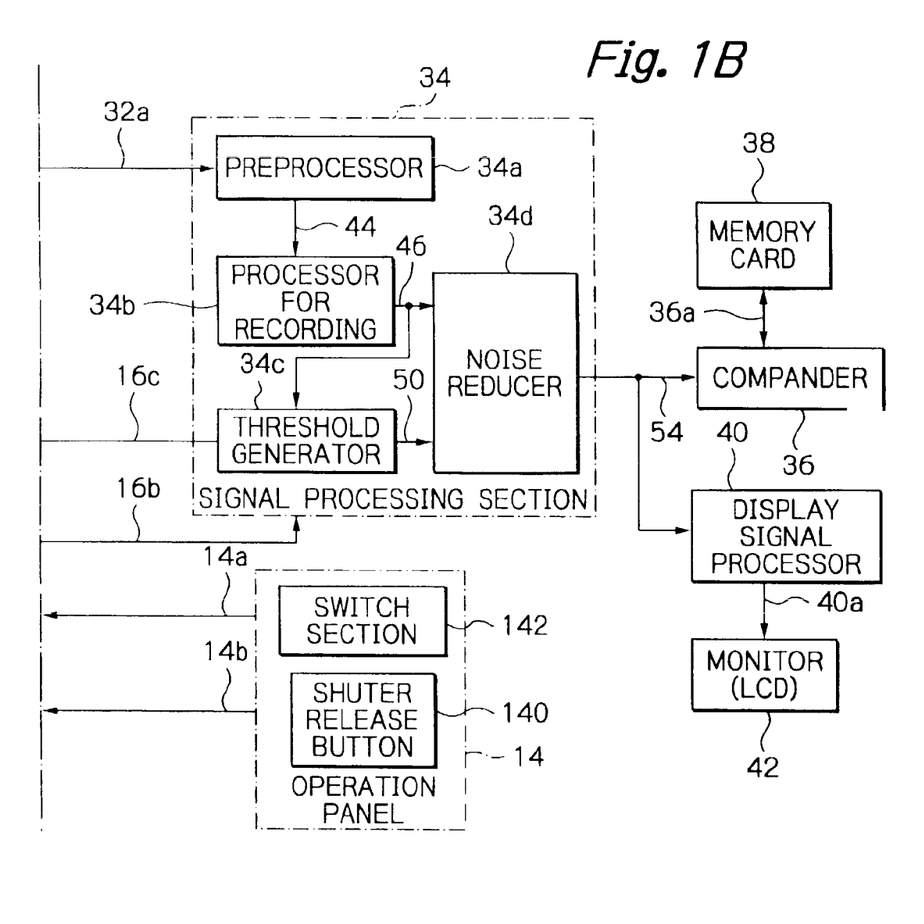

Referring to FIGS. 1A and 1B, an image signal processing device embodying the present invention is shown and applied to a digital camera by way of example. Part of the illustrative embodiment not relevant to the understanding of the present invention is not shown in FIGS. 1A and 1B and will not be described specifically. Signals are designated by reference numerals attached to connection lines on which they appear.

As shown in FIGS. 1A and 1B, the digital camera, generally 10, includes an optical lens system 12, an operation panel 14, a system controller 16, a drive signal generator 18, and a timing signal generator 20. The camera 10 further includes an iris mechanism 22, a mechanical shutter 24, a flashlight emitter 26, and an image pickup section 28, interconnected as depicted. In addition, the camera 10 includes an analog signal processor 30, an ADC (Analog-to-Digital Converter) 32, a signal processing section 34, a compander 36, a memory card 38 removably mounted to the camera 10, a display signal processor 40, and a monitor 42 implemented by a LCD (Liquid Crystal Display).

The lens system 12 includes, e.g., a plurality of lenses, a zoom mechanism, and an AF (Automatic Focus) control mechanism although not shown specifically. The zoom mechanism adjusts the axial positions of the lenses and therefore a view angle in response to an operation signal 14a received from the operation panel 14. The AF control mechanism controls focusing in dependent upon the distance between the camera 10 and a desired subject. The operation signal 14a is input to the system controller 16 as well when the operator of the camera 10 pushes a shutter release button 140 positioned on the operation panel 14, as will be described more specifically later.

The drive signal generator 18 includes a lens drive circuit not shown. The lens drive circuit delivers an AF drive signal 180 to the lens system 12 in accordance with a control signal 16a output from the system controller 16. The AF mechanism included in the lens system 12 moves the lenses on an optical axis in accordance with the AF drive signal 180, thereby focusing the lens system 12 on the subject to be picked up.

The operation panel 14 includes a switch section 142 in addition to the shutter release button 140. The switch section 142 includes a pointing device, not shown. The pointing device feeds a signal representing a desired position of the cursor to the display signal processor 40. The monitor 42 displays the cursor and items. The operator moves the cursor by operating the pointing device and selects an item pointed by the cursor by manipulating the switch section 142. In an application in which icons or boxes showing the items are actively displayed partially over a picture shown on the display screen, part of the picture is hidden behind the icons or boxes. In that application, the display signal processor 36 may be adapted to select either of the icons or boxes and the picture in active on the screen in response to manipulating the switch section 142. The pointing device of the switch section 142 may be implemented by, e.g., keys positioned in a cruciform or a touch panel mounted on the screen of the monitor 42.

The switch section 142 includes select keys and a set key for setting a command selected or sending it, although not shown specifically. The switch section 142 delivers to the system controller 16 the operation signal 14a representative of information relating to the operation and setting, which are performed by the operator. The shutter release button 140 feeds a timing signal 14b, which is another operation signal and representative of when to release the shutter 24, to the system controller 16.

The system controller 16 includes, e.g., a CPU (Central Processing Unit) and a ROM (Read Only Memory) although not shown specifically. The ROM stores a program describing the operation procedure of the camera 10. The system controller 16 generates a control signal 16b as well as the control signal 16a in accordance with the above operation procedure and the operation signals 14a and 14b, which are output from the operation panel 14. Particularly, the system controller 16 generates the control signal 16a on the basis of the stroke of the shutter release button 140. In the illustrative embodiment, the operator is assumed to push the shutter release button 140 to a half-stroke position by a first stroke and then to a full-stroke position by a second stroke.

The system controller 16 feeds the control signal 16a to the drive signal generator 18 and timing signal generator 20. Also, the system controller 16 feeds the control signal 16b to the analog signal processor 30 and ADC 32 as well as to the compander 36, display signal processor 40, and monitor 42; signal lines to the compander 36, display signal processor 40 and monitor 42 are not shown.

More specifically, the system controller 16 calculates an exposure value by adjusting a plurality of parameters such that standard or optimal exposure is to be effected. The control signal 16a is representative of the standard or optimal exposure.

The drive signal generator 18 includes an iris drive circuit, a shutter drive circuit, a pickup drive circuit, and a flashlight emitter drive circuit in addition to the previously stated lens drive circuit, although not shown specifically. The iris drive circuit feeds to the iris mechanism 22 a drive signal 182 corresponding to the control signal output from the system controller 16 and relating to exposure. The drive signal 182 is representative of a lens opening, exposure correction and so forth for, e.g., standard exposure.

The shutter drive circuit receives a timing signal 20a from the timing signal generator 20 and delivers a drive signal 184 to the mechanical shutter 24 in accordance with the timing signal 20a, as will be described more specifically later. The mechanical shutter 24 is driven by the drive signal 184.

The pickup drive circuit feeds a drive signal 186 to the image pickup section 28 in accordance with a timing signal 20b output from the timing signal generator 20. The pickup drive circuit receives electronic shutter releasing pulses, field shift pulses for reading out signal charges, and horizontal and vertical timing signals although not shown specifically. Taking account of the electrode structure of the image pickup section 28, the horizontal and vertical timing signals are adapted to cause signal charges to be transferred in a plurality of different phases shifted from each other. The pickup drive circuit combines the above pulses to thereby feed different kinds of horizontal drive signals and different kinds of vertical drive signals to the image pickup section 28.

As for the flashlight emitter drive circuit, assume that the system controller 16 receives the signal 14b representative of when the second stroke of the shutter release button 140 is depressed to the second stroke. Then, the system controller feeds the control signal 16a corresponding to the signal 14b to the flashlight emitter drive circuit. Assume that the operator has selected a flashlight emitter mode on the switch section 142. Then, because the quantity of electronic flashlight available with the flashlight emitter 26 is fixed, the system controller 16 selects various parameters relating to an exposure value beforehand in consideration of the distance between the camera 10 and the subject, lens opening, and shutter speed. The system controller 16 feeds a drive signal 188 to the flashlight emitter 26 in synchronism with the operation of the shutter release button 140, causing the flashlight emitter 26 to emit electronic flashlight.

The system controller 16 feeds a drive signal to the analog processor 30 as a gain control signal, although not shown specifically.

The timing signal generator 20 generates various kinds of timing signals including the timing signals 20a and 20b. The timing signals 20a and 20b are respectively input to the shutter driver and pickup driver included in the drive signal generator 18. The generated timing signals, not shown, are input to the analog signal processor 30 and ADC 32.

The iris mechanism 22 matches, in accordance with the drive signal 182, the diameter of an aperture that a light beam to be incident to the image pickup section 28 passes to a lens opening, which is determined by an exposure value. The drive signal 182 is based on the control signal 16a that the system controller 16 generates in accordance with the signal 14a, which is representative when the shutter release button 140 is depressed to the first stroke.

The mechanical shutter 24 opens and then closes in response to the drive signal 184 output from the drive signal generator 18, i.e., the shutter drive circuit. More specifically, the drive signal 184 causes the mechanical shutter 24 to allow a light beam to be incident to the image pickup section 28 only for a period of time determined by an exposure value. The drive signal 184 is based on the control signal 16a that the system controller 16 generates in accordance with the signal 14b, which is representative of when the shutter release button 140 is depressed to the second stroke.

Assuming the emission from the flashlight emitter 26 beforehand, the system controller 16 determines an exposure value in consideration of the quantity of emission, the distance between the camera 10 and the subject, pickup or imaging sensitivity and so forth. The drive signal 188 output from the drive signal generator 18 informs the flashlight emitter 26 of the emission and emission timing.

The image pickup section 28 includes an optical low-pass filter 28a, a color filter 28b and a solid-state image sensor 28c constructed integrally with each other. Optical image is incident to the image sensor 28c via the lens system 12, low-pass filter 28a, and color filter 28b. The image sensor 28c photoelectrically transforms the quantity of light incident on the individual photosensitive device thereof to a corresponding electric image signal. The image pickup section 28 outputs the resulting image signal 29. While the illustrative embodiment uses a CCD (Charge Coupled Device) array as the image sensor 28c, it is, of course, practicable with a MOS (Metal Oxide Semiconductor) solid-state image sensor.

More specifically, the image pickup section 28 includes a plurality of vertical transfer paths and a horizontal transfer path to which the vertical transfer paths converge. Signal charges generated in the photosensitive devices of the image sensor 28c are read out to the associated vertical transfer paths at a preselected timing, e.g., in a vertical blanking period by field shift. The signal charges are then transferred to the horizontal transfer path along the vertical transfer paths by line shift. An output circuit, not shown, is connected to the horizontal transfer path in order to convert the signal charges sequentially output from the horizontal transfer path to an analog voltage signal 29. The analog voltage signal 29 is input to the analog signal processor 30.

In an application in which the image sensor 28c is implemented by a CCD image sensor, the signal charges are selectively read out in a selective scanning mode, e.g., a thinning read-out mode, or a progressive scanning mode, e.g., a whole pixel read-out mode.

The color filter 28b is, e.g., a single filter having a plurality primary color or complementary color filter segments arranged in a preselected pattern. The filter segments correspond one-to-one to the photosensitive devices of the image sensor 28c. The camera 10 reads out the signal charges in consideration of the above pattern in accordance with the signal charge reading mode.

The analog signal processor 30 includes CDS (Correlated Double Sampling) circuitry not shown. The CDS circuitry includes a clamping circuit and a sample and hold circuit. The clamping circuit clamps, in response to the timing signal output form the timing signal generator 20, various kinds of noise basically ascribable to the photosensitive devices of the image sensor 28c. The sample and hold circuit holds the signal charges in response to the timing signal. With this configuration, the analog signal processor 30 feeds a noise-free analog signal 30a to the ADC 32.

The ADC 32 quantizes the levels of the analog signal 30a by using a preselected quantization level to thereby convert the signal 30a to a digital signal or pixel data 32a. The digital signal 32a is fed from the ADC 32 to the signal processing section 34 in response to the timing signal output from the timing signal generator 20 and including a conversion clock.

The signal processing section 34 includes a preprocessor 34a, a processor for recording 34b, a threshold generator 34c, and a noise reducer 34d. The preprocessor 34a determines the level of the individual pixel data 32a lying in the preselected region of the image picked up. At the same time, the preprocessor 34a executes various kinds of linear signal processing on the pixel data 32a. The signal processing includes black level correction, white balance gain correction, shading correction and so forth. The preprocessor 34a outputs image data 44 that are raw data unable to form a picture. When the image data 44 are to be repeatedly read out and processed, the preprocessor 34a should preferably include a plurality of frame memories, more preferably nondestructive frame memories. The image data 44 are input to the processor for recording 34b.

Further, the preprocessor 34a performs level detection with the image data in consideration of, e.g., the pattern in which the color filter segments are arranged. The level detection includes region-by-region photometry executed on the divided regions of an image, AE (Automatic Exposure) control, AF control for adjusting the distance between the camera 10 and the subject, and AWB (Automatic White Balance) control. Because the image data are output by way of the color filter 28b, a luminance signal cannot be directly attained. In light of this, green (G) or magenta (Mg) may be dealt with as a luminance signal when the color filter 28b uses primary colors or complementary colors, respectively. The preprocessor 34a delivers the results of detection to the system controller 16 although a signal line is not shown specifically.

The processor for recording 34b includes a level correcting circuit, a gamma correcting circuit, an interpolating circuit, a chrominance matrix circuit and a frame memory, although not shown specifically. Such circuits operate in response to the control signal 16b output from the system controller 16. Specifically, the processor 34b corrects the level of the image data and feeds the corrected image data to the gamma correcting circuit. The gamma correcting circuit reads a value corresponding to the input image data out of a lookup table and then executes gamma correction. For more delicate gamma correction, the gamma correcting circuit may perform arithmetic operation.

The image data output from the processor for recording 34b and subjected to nonlinear processing are input to the interpolating circuit. Because the color filter 28b is a single color filter, color data are generated only at positions corresponding to the color filter segments. The interpolating circuit interpolates color data in the spaces between nearby color filter segments by using actually generated image data.

At this instant, the interpolating circuit generates the above color data in matching relation to the number of pixels included in the format of an image to be recorded. More specifically, for a given subject pixel being observed, the interpolating circuit uses a mean value of the sum of pixels surrounding the subject pixel.

The interpolating circuit may interpolate color data in a subject pixel by using, among pixels surrounding it, pixels correlated to each other on the basis of correlation coefficient. The interpolating circuit generates plane data of three primary colors red (R), G and black (B) and feeds them to the chrominance matrix circuit. The chrominance matrix circuit produces a luminance signal Y and chrominance signals (R–Y) and (B–Y) from the R, G and B plane data. The luminance signal Y and chrominance signals (R–Y) and (B–Y) are written to the frame memory. In practice, a plurality of nondestructive frame memories are arranged to prepare for, e.g., continuous shots, so that the image data 44 can be repeatedly read thereoutof.

More specifically, the frame memories allow image data 46 to be repeatedly read thereoutof and used for, e.g., averaging included in noise reduction to follow. The frame memories therefore even allow the image data 46 to be read out while being reduced, or thinned out, under the address control of the system controller 16. The image data 46 are input to the threshold generator 34c and noise reducer 34d.

Figure 2:
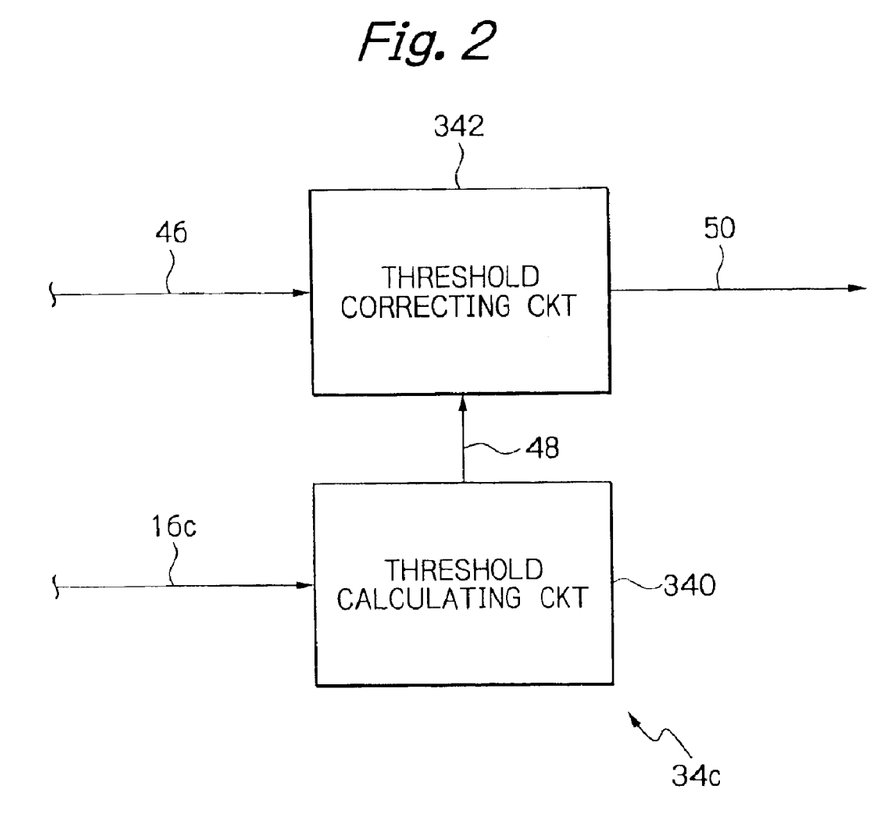
FIG. 2 is a schematic block diagram showing a specific configuration of a threshold generator included in the illustrative embodiment.

As shown in FIG. 2, the threshold generator 34c includes a threshold calculating circuit 340 and a threshold correcting circuit 342 interconnected as illustrated. The threshold calculating circuit 340 calculates a threshold for the entire image in accordance with various parameters or shooting conditions 16c collected in the system controller 16. The parameters include at least one of pickup sensitivity, exposure conditions, shoot mode, sharpness, the kind of light source, operation and a display magnification.

As for sensitivity, use is made of ISO (International Standardization Organization) sensitivity, ASA (American Standards Association) sensitivity or DIN (Deutsche Industrie Normen) sensitivity. The exposure conditions include a lens opening and a shutter speed and/or an electronic shutter speed. The shoot mode may be any one of a night scene mode, a front-lighting/backlight mode in a normal mode, an evening mode, and continuous shooting mode.

Sharpness is dependent on resolution and contrast and often used in the sensation aspect. Such qualitative estimation is represented by a numerical parameter. As for the kind of a light source, a particular parameter is assigned to each of fine weather, cloudy weather, sunlight dependent on the time of a day (dawn, sunset and so forth), a photographic bulb, a tungsten lamp and so forth. As for manual operation, use is made of a parameter taking account of an exposure value that varies from a shot with flashlight to a shot without flashlight, i.e., a guide number. The display magnification is represented by, e.g., the enlargement/reduction ratio of electronic zoom.

The threshold calculating circuit 340 generates a threshold level 48 for the entire image by using one or more of the various parameters mentioned above. The threshold level 48 is input to the threshold correcting circuit 342. The threshold correcting circuit 342 corrects the threshold level on the basis of the luminance level or the color level of the individual pixel data.

Specifically, in the illustrative embodiment, the threshold correcting circuit 342 uses a luminance level for correcting the threshold level. The correction takes account of gamma correction, which is specific nonlinear processing, by way of example. Generally, gamma correction tends to increase gain if the input level is low or reduce it if the input level is high. An increase in gain, however, tends to increase noise included in the input signal also. In light of this, the threshold correcting circuit 342 varies the threshold 48 by using the luminance data Y, which are included in the image data 46, as will be described hereinafter.

It is likely that low-level luminance data Y subjected to gamma correction are amplified and contain much noise. The threshold correcting circuit 342 therefore selects a threshold higher than the calculated threshold 48 for low-level luminance data Y. Conversely, high-level luminance data Y are not noticeably increased in gain despite gamma correction, so that noise is presumably amplified little. For such high-level luminance data Y, the circuit 342 selects a threshold lower than the calculated threshold 48. In this manner, the circuit 342 corrects the threshold 48 within preselected ranges above and below the threshold 48. A corrected threshold 50 is fed from the circuit 342 to the noise reducer 34d, FIG. 1B.

The luminance data Y used to correct the calculated threshold 48 may be replaced with color data $C_r$ or $C_b$. Because noise in color data tends to be conspicuous in the dark portion of an image, noise reduction applied to a dark portion is successful to reduce noise when digital gain is increased.

Threshold correction relating to the other parameters will be briefly described hereinafter. When pickup sensitivity is increased from, e.g., ISO 100 to ISO 400, the threshold correcting circuit 342 so raises the threshold as to enhance noise reduction in accordance with the increase in sensitivity. More specifically, an increase in sensitivity directly translates into an increase in gain as to signals that are dealt with within the camera 10. The circuit 342 corrects the threshold in order to prevent noise from increasing along with the gain.

As for the exposure conditions, the threshold correcting circuit 342 selects a threshold that enhances noise reduction when exposure is short. More specifically, when the exposure value is short, the camera 10 usually increases the gain of a signal in order to compensate for the short exposure value. The circuit 342 corrects the threshold for reducing noise otherwise increasing along with the above gain. For example, when the camera 10 outputs a still picture in a night scene mode, noise is conspicuous because of long exposure and the low luminance level of the entire image. Such noise can also be reduced by the circuit 342.

On the other hand, in a movie mode also available with the camera 10, noise is not as conspicuous as in a still picture mode. When the monitor 42 is expected to display a scene being picked up, noise is inconspicuous because the resolution of the monitor 42 is not so high. In a movie mode, therefore, the threshold correcting circuit 342 sets the threshold so as not to enhance noise reduction.

As for sharpness, the threshold correcting circuit 342 corrects the threshold in such a manner as to enhance noise reduction in accordance with an increase in sharpness, as done with respect to the sensitivity of the image sensor, exposure conditions, and night scene mode. This also prevents the noise from increasing.

Further, the threshold correcting circuit 342 corrects the threshold for noise reduction on the basis of the kind of a light source. For example, under a circumstance that the camera 10 shoots a scene illuminated by, e.g., a tungsten lamp or a fluorescent lamp whose color temperature is far different from the color temperature of ordinary light, the camera 10 increases gain in accordance with white balance control. The circuit 342 selects a threshold capable of reducing noise ascribable to the increase in gain.

Referring again to FIG. 1, the noise reducer 34d not only reduces noise, but also detects an edge and applies original pixel data to the edge without averaging the pixel data. This is because if the edge portion of an image is removed as noise and then filled with a mean value, then resolution decreases due to smoothing and thereby lowers image quality.

Figure 3:
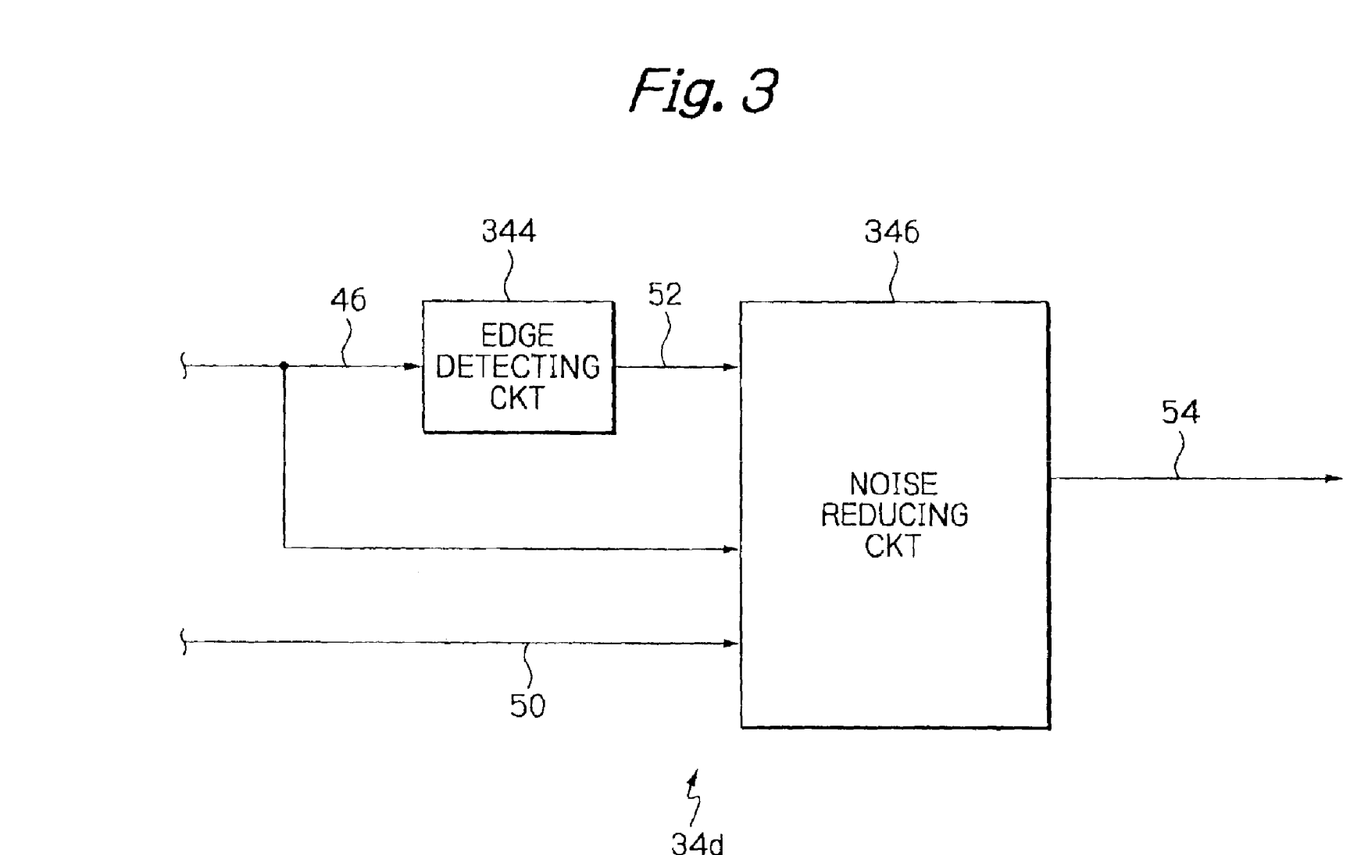
FIG. 3 is a schematic block diagram showing a specific configuration of a noise reducer also included in the illustrative embodiment.

As shown in FIG. 3 specifically, the noise reducer 34d includes an edge detecting circuit 344 and a noise reducing circuit 346 both of which receive the image data 46. The edge detecting circuit 344 feeds an inhibition signal 52 to the noise reducing circuit 346. The inhibition signal 52 inhibits noise reduction from being applied to the position of an edge portion when in a high level.

Figure 4:
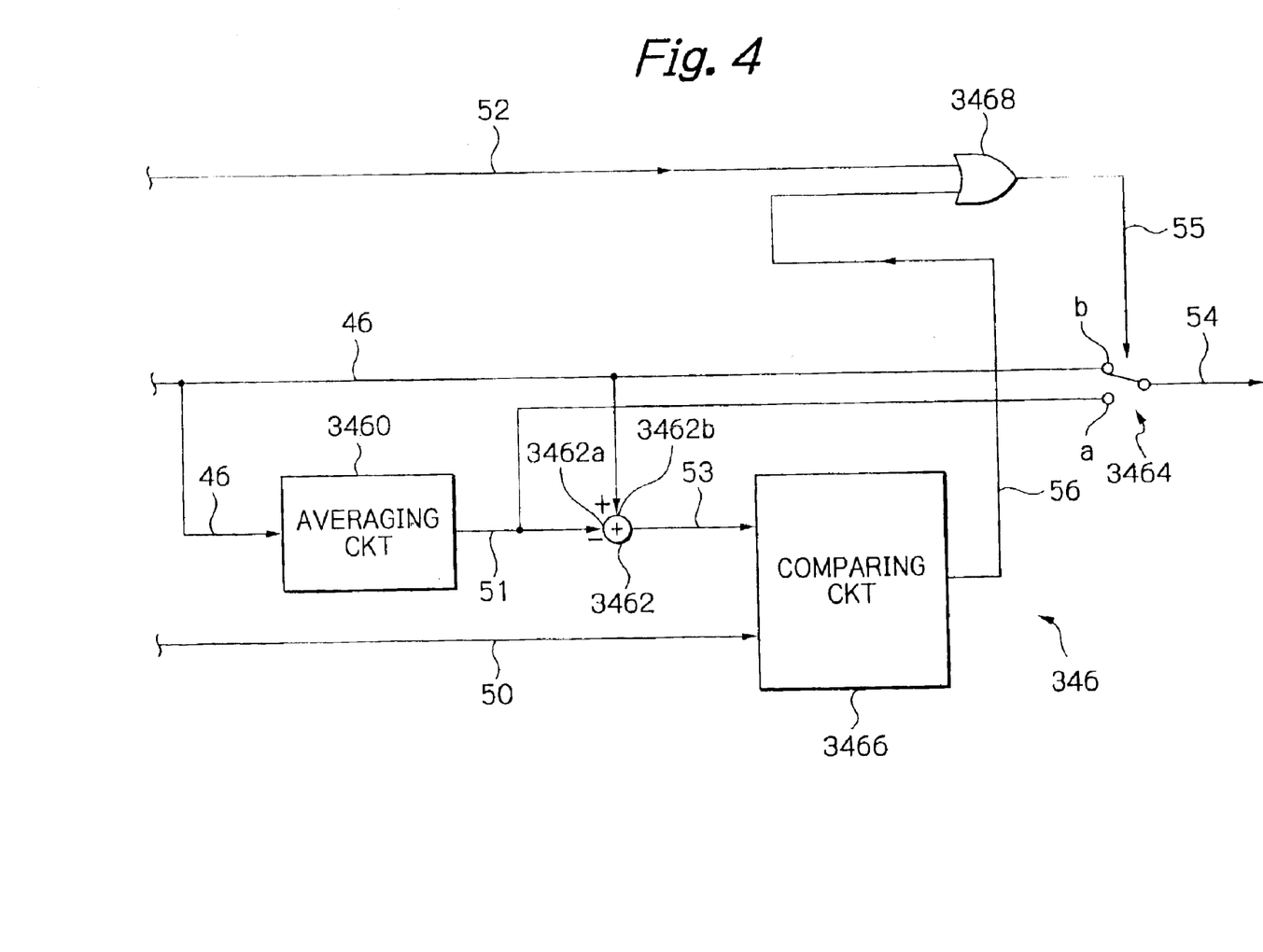
FIG. 4 is a schematic block diagram showing a specific configuration of a noise reducing circuit included in the noise reducer of FIG. 3.

FIG. 4 shows a specific configuration of the noise reducing circuit 346. As shown, the noise reducing circuit 346 is made up of an averaging circuit 3460, an adder 3462, a switch or selector 3464, a comparing circuit 3466, and an OR gate 3468 interconnected as shown. The averaging circuit 3460 adds the level of, among the input image data or pixel data 46, subject pixel data being observed and the levels of a plurality of pixel data around the subject pixel data. The averaging circuit 3460 then divides the resulting sum by the total number of the pixels, of which the data have been added to each other, to thereby produce a mean value. The mean value, labeled 51, is fed to one input (−) 3462a of the adder 3462 and one input a of the switch 3464.

The image data 46 is applied also to the other input (+) 3462b of the adder 3462 and the other input b of the switch 3464. The adder 3462 produces the absolute value 53 of a difference between the mean value 51 and the image data 46 (simply difference 53 hereinafter). The OR gate 3468 feeds a switching signal 55 to the switch 3464. The switching signal 55 causes the switch 3464 to select the input b, i.e., the image data 46 when in a high level or causes it to select the input a, i.e., the mean value 51 when in a low level. The switch 3464 therefore outputs image data 54 containing a minimum of noise.

The corrected threshold 50 and difference 53 are input to the comparing circuit 3466. The comparing circuit 3466 outputs a signal 56 that is in a high level if the level of the difference 53 is above the threshold 50 inclusive or in a low level if otherwise.

The inhibition signal 52 output from the edge detecting circuit 344 and the signal 56 output from the comparing circuit 3466 are input to the OR gate 3468. The switching signal 55 fed from the OR gate 3468 to the switch 3464 is representative of an OR of the two input signals 52 and 56. Specifically, the signal 55 is in its high level if either one of the signals 52 and 56 is in its high level or is in its low level if otherwise.

With the above configuration, the noise reducing circuit 346 determines, based on the image-by-image corrected threshold 50, whether or not to replace the image data 46 with a mean value, thereby reducing noise. Consequently, as for the luminance data Y, many of the resulting pixel data 54 are replaced with mean values at the low luminance side for enhancing noise reduction. At the high luminance side, the original pixel data 46 are used. In this manner, the noise reducer 34d selects either one of the subject pixel of the pixel data 46 compared with the corrected threshold 50 and a mean value and feeds the resulting image data 54 to the compander 36 and display signal processor 40.

It is to be noted that the edge detecting circuit 344 picks up only high-frequency components by using, e.g., differentiation, which is a typical conventional scheme.

Referring again to FIG. 1, the compander 36 includes a compressing circuit and an expanding circuit, although not shown specifically. The compressing circuit compresses one frame of image data (luminance data and chrominance data) 54 by use of, e.g., a JPEG (Joint Photographic Experts Group) scheme that uses orthogonal transform. The expanding circuit expands the compressed image to thereby restore original data.

In a record mode, the compander 36 writes compressed data 38a in the memory card 38 via a memory card interface, not shown, in accordance with the control signal 16b, which is output from the system controller 16. In a reproduction mode, the compander 36 reads the data 36a out of the memory card 38 via the memory card interface. The compander 36 then processes the data 36a in a preselected sequence and writes the expanded data in, e.g., a frame memory, not shown, included in the processor for recording 34b. The memory card 38 is implemented by a Smart Media (trade name), an IC (Integrated Circuit) card or similar recording medium.

The display signal processor 40 includes a display level correcting circuit and a display converting circuit, although not shown specifically. The system controller 16 generates the control signal 16b by taking account of the data detected by the preprocessor 34a and feeds the control signal 16b to the level correcting circuit. The level correcting circuit corrects a display level in accordance with the control signal 16b.

The display converting circuit reads a preselected number of pixels, which should be displayed on the monitor 42, out of the frame included in the display signal processor 40. For example, when 1,280×1,024 pixels should be reduced to one-fourth, i.e., 320×240, the display converting circuit processes a reduced number of image data by controlling the address of the frame memory. Further, when the image should be enlarged or reduced by electronic zoom, the display converting circuit reads the image data corresponding to a desired region out of the frame memory and executes interpolation or reduction with the image data. The display converting circuit converts the interpolated or reduced image data to an analog signal 40a, labeled 40a, with a digital-to-analog converter (DAC), not shown and feeds the signal 40a to the monitor 42.

The monitor 42 displays the input luminance data and chrominance data 54 at a timing controlled by the system controller 16. The monitor 42 may display an image based on three primary colors R, G and B, if desired.

Figure 5:
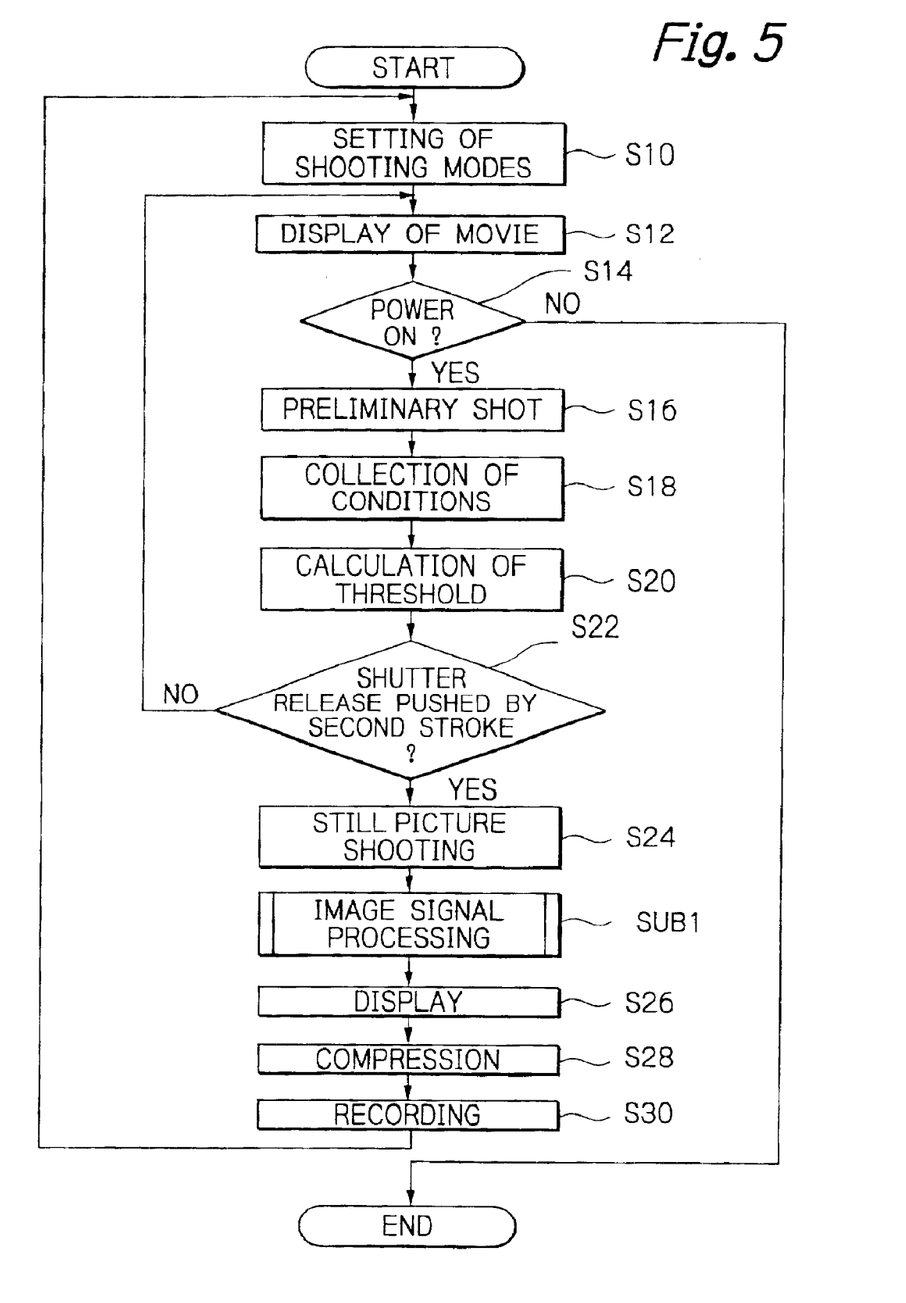
FIG. 5 is a flowchart showing a main routine unique to the illustrative embodiment.

Reference will be made to FIG. 5 for describing a specific procedure unique to the illustrative embodiment. First, the operator of the camera 10 turns on a power switch, not shown, sets initial conditions, and selects a shooting mode by way of example. When the operator selects a mode other than the shooting mode, a particular procedure assigned to the mode will be executed. Further, assume that the operator selects a night scene mode by way of example (step S10). In this condition, a scene being picked up is displayed on the monitor 42 as a movie while being subjected to reduction, or thinning, and display signal processing (step S12).

After the step S1, the system controller 16 determines whether or not the power switch is in an ON state (step S14). If the answer of the step S14 is negative (NO), the procedure ends. If the answer of the step S14 is positive (YES), the system controller 16 causes the image pickup section 28 to effect preliminary pickup (step S16). Specifically, when the operator pushes the shutter release button 140 to the half-stroke position by the first stroke, image data for photometry are input to the preprocessor 34a. The preprocessor 34a detects levels on the basis of the input image data 32a. At this instant, the preprocessor 34a distinguishes color image data dependent on the pattern of the color filter 28b and image data close to black and white. The levels detected and information on various settings are input to the system controller 16.

The system controller calculates an exposure value in accordance with the levels fed from the preprocessor 34a. The exposure value is a parameter indicative of a lens opening and a shutter speed. Specifically, in the night scene mode, the system controller 16 determines an exposure value by taking account of the quantity of emission, i.e., whether or not a flashlight mode is selected and the distance between the camera 10 and the subject. In addition, the system controller 16 amplifies the image signal output in the night scene mode.

The system controller 16 selects, among the information on the result of calculation and mode selected, information 16c on conditions (parameters) necessary for the calculation of a threshold (step S18). The information 16c is fed to the threshold generating circuit 34c.

Specifically, the information or parameters 16c are input to the threshold calculating circuit 340 included in the threshold generator 34c. The threshold calculating circuit 340 calculates a threshold by using the parameters 16c (step S20). In this manner, a threshold is calculated beforehand during preliminary pickup.

Subsequently, the system controller 16 determines whether or not the operator has pushed the shutter release button 140 to the full-stroke position by the second stroke (step S22). If the answer of the step S22 is YES, the system controller 16 causes, in response to the signal 14b output from the operation panel 14, the image pickup section 28 to read out all pixels. That is, the image pickup section 28 takes a still picture (step S24). If the answer of the step S22 is NO, the operation returns to the step S12.

Specifically, in the step S24, the image sensor 28c transforms light incident thereto via the color filter 28b to signal charges. The resulting image signal 29 is digitized and then written to the frame memory of the preprocessor 34a. More specifically, the image signal output from the image sensor 28c is input to the analog signal processing 30. The analog signal processing 30 controls the gain of the image signal 29 and then feeds it to the ADC 32. The ADC 32 converts the analog signal 30a to the digital signal 32a. The digital signal 32a is delivered to the preprocessor 34a.

The step S24 is followed by a subroutine SUB1 in which the image data 32a are subjected to a sequence of signal processing in order to reduce the noise of the image. The subroutine SUB1 will be described in detail later. The processed image data 54 are input to the compander 36 and display signal processor 40.

The display signal processor 40 thins out, under the control of the system controller 16, the image data 54 in such a manner as to match them to the number of pixels to be displayed on the monitor 42. The thinned or reduced image data 40 are converted to an analog signal by the previously mentioned DAC and then input to the monitor 42. The monitor 42 displays a signal based on the image data 40a for a preselected period of time (step S26). This allows the operator to see how the camera 10 shot the subject.

The compander 36 compresses the image data 54 by, e.g., the JPEG scheme (step S28) and feeds the compressed image data 36a to the memory card 38 via the memory card interface. The image data 36a are recorded in the memory card 38 under the control of the system controller 16 (step S30). After the step S30, the procedure returns to the step S10.

Figure 6:
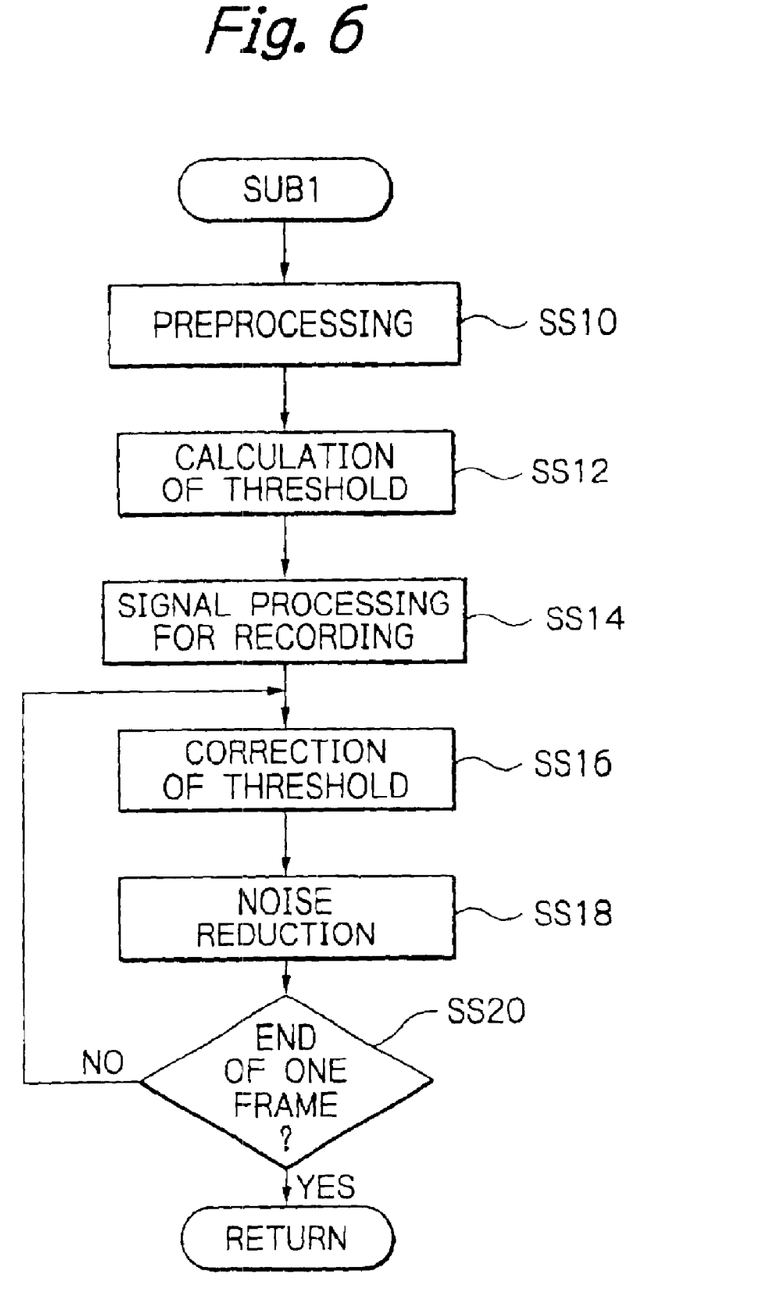
FIG. 6 is a flowchart showing a subroutine included in the main routine specifically.

The subroutine SUB1 will be described in detail with reference to FIG. 6. As shown, the image data 32a fed to the preprocessor 34a are written to the frame memory (substep SS10). In a continuous shooting mode, two or more sequences of image data 32a each being representative of a particular shot are respectively written to a plurality of frame memories. Because use is made of nondestructive frame memories, the image data 32a can be repeatedly read out of the frame memories under the control of the system controller 16. The preprocessor 34a detects levels and executes various kinds of correction, as stated earlier. The result of level detection is delivered to the system controller 16 although a signal line is not shown. On the other hand, the corrected image data 44 are input to the processor for recording 34b.

The system controller 16 calculates an exposure value on the basis of the levels fed from the preprocessor 34a and then determines a lens opening and a shutter speed. Also fed to the system controller 16 is the information input on the operation panel 14. The system controller 16 delivers the parameters 16c necessary for the calculation of a threshold to the threshold generator 34c.

In the threshold generator 34c, the threshold calculating circuit 340 calculates a threshold for the entire image picked up (substep SS12). The threshold is therefore dependent on image pickup parameters or conditions. The threshold is represented by a numerical value taking account of the influence of the individual parameter.

While the threshold calculating circuit 340 is shown as being included in the signal processing section 34, it may alternatively be disposed in the system controller 16. This is desirable because the signal processing section 34 sets an exposure value on the basis of the levels detected by the preprocessor 34a and because information set and so forth can be put together. In such a case, the system controller 16 delivers the threshold to the threshold correcting circuit 342.

In the illustrative embodiment, the threshold generator 34c includes the threshold calculating circuit 340 and threshold correcting circuit 342. This configuration is expected to allow correspondence to be easily set up when the threshold is corrected pixel by pixel, as will be described specifically later.

After the substep SS12, the processor for recording 34b executes various kinds of signal processing with the image data 44 to thereby generate the luminance data Y and chrominance data (R–Y) and (B–Y) (substep SS14). More specifically, the processor for recording 34b sequentially executes level correction, gamma correction and interpolation for thereby outputting R, G and B plane data. The chrominance matrix circuit produces a luminance signal Y, chrominance signals (R–Y) and (B–Y) from the R, G and B plane data. The luminance signal Y and chrominance signals (R–Y) and (B–Y) are fed to the threshold generator 34c and noise reducer 34d as image data 46. If the image data 46 should be repeatedly read out in the processing to follow, then it is preferable to execute various kinds of processing with the image data 46 and then write the processed image data in a nondestructive frame memory not shown.

Subsequently, in the threshold generator 34c, the threshold correcting circuit 342 corrects, pixel by pixel, the threshold 48 fed from the threshold calculating circuit 340

(substep SS16). For the correction, the circuit 342 uses the luminance level or the chrominance level of the individual pixel. It is well known that in a night scene mode, as in the illustrative embodiment, the noise level is high despite the low luminance level and is therefore conspicuous. It is also known that when the luminance level is low, the influence of gamma correction is great. For such reasons, thresholds above the calculated threshold inclusive are applied to the night scene mode. On the other hand, thresholds below the calculated threshold are applied to pixels having high luminance levels. The thresholds 50 corrected pixel by pixel are input to the noise reducer 34d.

The chrominance data level used for threshold correction may be substituted for the luminance data level. In fact, noise is conspicuous in the dark portion of an image, i.e., a portion where the color data level is high. If the threshold is corrected in consideration of such a tendency, then noise reduction processing to follow becomes more effective. This is particularly true when gain is digitally raised.

The noise reducer 34d selects either one of the pixel level $L_{46}$ (46, FIG. 4) of a subject pixel and the mean value $L_{AV}$ (51, FIG. 4) of the subject pixel and pixels around it in accordance with the threshold 50 input thereto except for an edge portion (substep SS18). As for an edge portion, the noise reducer 34d uses the output signal 52 of the edge detecting circuit 344.

More specifically, in the substep SS18, a difference $L_{DIF}$ between the pixel level $L_{46}$ of a subject pixel and a mean value $L_{AV}$ is calculated. When the difference $L_{DIF}$ is calculated without regard to the direction of shift, it is preferable to use the absolute value of the difference. Subsequently, the threshold 50 assigned to the subject pixel and the difference $L_{DIF}$ are compared. If the difference $L_{DIF}$ is smaller than the threshold 50, meaning that the pixel is low in signal level and contains much noise, use is made of the mean value $L_{AV}$ containing little random noise because of averaging. If the difference $L_{DIF}$ is greater than the threshold 50 inclusive, then the subject pixel presumably has a sufficiently high signal level relative to the surrounding pixels and has a high S/N (Signal-to-Noise) ratio. In this case, the original pixel level $L_{46}$ of the subject pixel is used.

Figure 7:
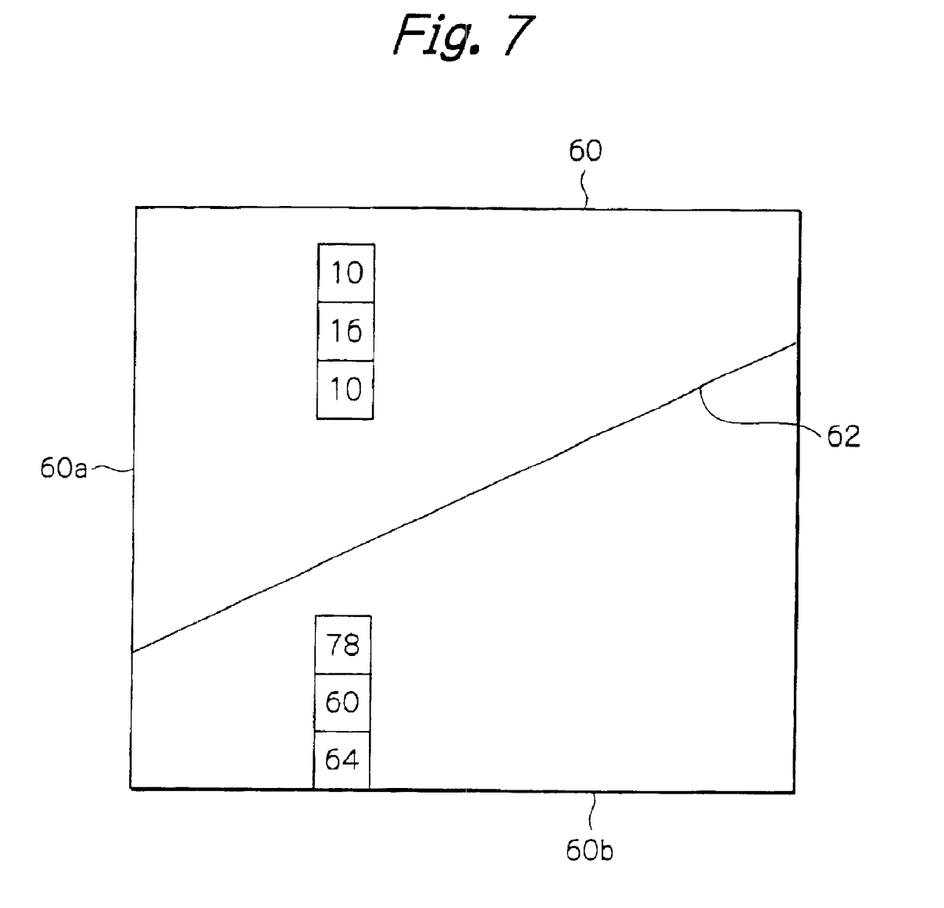
FIG. 7 shows a specific image useful for understanding noise reduction included in the procedure of FIG. 5.

FIG. 7 shows a specific image 60 to which the above substep SS18 is applied. As shown, the image 60 is divided into two regions 60a and 60b by an edge or boundary 62. Assume that the regions 60a and 60b have mean pixel levels "10" and "50" respectively. In the specific image 60, noise reduction is executed with each three pixels adjoining each other in the direction of columns, while assuming the intermediate pixel to be a subject pixel.

Assume that the corrected threshold 50 assigned to the subject pixel in the region 60a is a level "8", which is higher than a usual level. Further, assume that the subject pixel has a pixel level $L_{46}$ "16" and that the other pixels positioned above and below the subject pixel both have a pixel level $L_{46}$ "10". Then, the mean value $L_{AV}$ of the three pixels is (10+16+10)/3=12. The difference $L_{DIF}$ is therefore 16−12= 4. Because the difference $L_{DIF}$ is smaller than the threshold 50, the level "16" of the subject pixel is replaced with a level "12". This successfully reduces noise contained in the subject pixel.

Likewise, assume that the corrected threshold 50 assigned to the subject pixel in the region 60b is a level which is lower than a usual level. Further, assume that the subject pixel has a pixel level $L_{46}$ "60", and that the other pixels positioned above and below the subject pixel both have pixel levels $L_{46}$ "78" and "64", respectively. Then, the mean value $L_{AV}$ of the three pixels is (78+60+64)/3=67. The difference $L_{DIF}$ is therefore |60−67|=7. Because the difference $L_{DIF}$ is greater than the threshold 50, meaning that noise is inconspicuous, the level "60" of the subject pixel is used. Such noise reduction is sequentially executed with all pixels constituting a frame.

After the substep SS18, the system controller 16 determines whether or not noise reduction has been executed with the entire frame of pixels (substep SS20). If the answer of the substep SS20 is NO, then the procedure returns to the substep SS16 in order to read out the pixel next to the pixel data 46 and subject it to noise reduction. This is effected under the control of the system controller 16. If the answer of the substep SS20 is YES, then the subroutine SUB1 ends (RETURN).

The procedure described above easily realizes a high-quality image that contains less noise than conventional images and suffers from a minimum of deterioration even in, e.g., a night scene mode, which renders noise conspicuous. While the specific procedure uses a simple mean value of a sum, i.e., a weighting coefficient of 0.5, each pixel may, of course, be multiplied by a particular weighting coefficient in accordance with its position before averaging.

As stated above, the illustrative embodiment determines a threshold pixel by pixel in consideration of various shooting conditions and then selects either one of the original pixel level and a mean value. The resulting image therefore contains a minimum of noise. For example, an image picked up in a night scene mode is higher in quality than conventional images. Further, the illustrative embodiment corrects the threshold pixel by pixel to thereby further reduce noise.

While the illustrative embodiment has concentrated on a digital camera, the present invention is, of course, applicable to any other apparatus that collects image inputting conditions and then generates an image.

In summary, it will be seen that the present invention provides an image signal processing device capable of reducing noise contained in an image in accordance with image inputting conditions and thereby protecting an image from deterioration. Therefore, the device of the present invention insures a high-quality image free from conspicuous noise without regard to the image inputting conditions.

The entire disclosure of Japanese patent application No. 2000-191068 filed on Jun. 21, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An image signal processing device for executing signal processing on image data representative of an input image, said device comprising:
   a signal processing circuit for executing signal processing on the image data for correction and recording, and executing noise reduction on individual image data in accordance with at least one of image inputting conditions and a pixel level;
   said signal processing circuit comprising;
   a threshold generating circuit for generating a threshold by taking account of at least one of the image inputting conditions and the pixel level; and a noise reducing circuit for producing, during the noise reduction, a difference in level between, subject pixel data whose noise is to be detected and a mean value of said subject pixel data and pixel data around said subject pixel data, and selecting either one of said subject pixel data and said mean value in accordance with said difference and the threshold.

2. The device in accordance with claim 1, wherein said threshold generating circuit comprises:

a condition collecting circuit for collecting various conditions for determining the threshold; and a calculating circuit for calculating the threshold in accordance with the conditions collected.

3. The device in accordance with claim 2, wherein said threshold generating circuit further comprises a threshold correcting circuit for correcting the threshold in accordance with a level of the subject pixel data.

4. The device in accordance with claim 3, wherein said condition collecting circuit collects at least one of pickup sensitivity, an exposing condition, a shooting mode, sharpness, a kind of a light source, an operation, and a display magnification.

5. The device of claim 3, wherein the threshold is determined for an entire image, and the correcting circuit operates on a pixel by pixel basis to adjust the threshold.

6. The device in accordance with claim 1, wherein said noise reducing circuit comprises:

a difference calculating circuit for calculating a difference in level between the subject pixel data and the pixel data around said subject pixel data;

a mean value calculating circuit for calculating a mean value of the subject pixel data and the pixel data around said subject pixel data;

a comparing circuit for comparing the difference and the threshold to thereby determine which of the subject pixel data and the mean value should be used; and a switch for selecting either one of the subject pixel data and the mean value in accordance with a result of comparison output from said comparing circuit.

7. The device in accordance with claim 6, wherein said mean value calculating circuit multiplies each pixel data around the subject pixel data by a particular weighting coefficient on the basis of a position of said pixel data to thereby calculate the mean value.

8. The device according to claim 6, wherein said difference calculating circuit calculates a selecting difference between the subject pixel data and an average value calculated with 1) the subject pixel data and 2) data around the subject pixel, and wherein the comparing circuit compares the selecting difference and the threshold to determine which of the subject pixel data and the average value should be used.

9. The device of claim 1, wherein the noise reducing circuit is operable to alternatively select one of the subject pixel data and the mean value.

10. The device of claim 1, wherein the mean value includes a sum of the subject pixel data and n pixel data around said subject pixel, said sum divided by n+1, where n is an integer.

11. The device of claim 1, further including an edge detector, wherein the edge detector causes selection of the subject pixel data regardless of the difference between the subject pixel data and mean value when an edge is detected at said subject pixel.

12. A method of processing image data representative of an input image to thereby generate an image, comprising:

a first step of collecting image inputting conditions under which the image is input;

a second step of calculating a threshold for determining, based on the image inputting conditions, whether or not to use subject pixel data to which noise reduction is to be applied;

a third step of calculating a mean value of a level of the subject pixel data and levels of pixel data around said subject pixel;

a fourth step of producing a difference between the level of the subject pixel data and the mean value; and a fifth step of comparing the difference and the threshold to thereby select either one of the subject pixel data and the mean value.

13. The method in accordance with claim 12, further comprising the step of correcting the threshold value calculated in said second step before said fifth step.

14. The method in accordance with claim 13, wherein the image inputting conditions comprise at least one of pickup sensitivity, an exposing condition, a shooting mode, sharpness, a king of a light source, an operation, and a display magnification.

15. The method of claim 13, wherein the threshold value is determined for an entire image, and the correcting of the threshold value is performed on a pixel by pixel basis to adjust the threshold.

16. The method in accordance with claim 12, wherein the image inputting conditions comprise at least one of pickup sensitivity, an exposing condition, a shooting mode, sharpness, a king of a light source, an operation, and a display magnification.

17. The method in accordance with claim 12, wherein said third step comprises the step of multiplying each pixel data around the subject pixel data by a particular weighting coefficient on the basis of a position of said pixel data to thereby calculate the mean value.

18. The method of claim 12, wherein the mean value includes a sum of the subject pixel data and n pixel data around said subject pixel, said sum divided by n+1, where n is an integer.

19. The method of claim 12, further comprising detecting whether an edge occurs at the subject pixel, wherein selection of the subject pixel data occurs regardless of the difference between the subject pixel data and mean value when an edge is detected at said subject pixel.

20. An image signal processing device for executing signal processing on image data representative of an input image, comprising:

a signal processing circuit for executing signal processing on the image data for correction and recording, and executing noise reduction on individual image data in accordance with at least one of image inputting conditions and a pixel level;

said signal processing circuit comprising:

a threshold generating circuit for generating a threshold by taking account of at least one of the image inputting conditions and the pixel level; and a noise reducing circuit for producing, during the noise reduction, a difference in level between subject pixel data whose noise is to be detected and a mean value of pixel data around the subject pixel data, and selecting either one of the subject pixel data and the mean value in accordance with the difference and the threshold.

21. The device in accordance with claim 20, wherein said threshold generating circuit comprises:

a condition collecting circuit for collecting various conditions for determining the threshold; and a calculating circuit for calculating the threshold in accordance with the conditions collected.

22. The device in accordance with claim 21, wherein said threshold generating circuit further comprises a threshold correcting circuit for correcting the threshold in accordance with a level of the subject pixel data.

23. The device in accordance with claim 22, wherein said condition collecting circuit collects at least one of pickup sensitivity, an exposing condition, a shooting mode, sharpness, a kind of a light source, an operation, and a display magnification.

24. The device in accordance with claim 20, wherein said noise reducing circuit comprises:

a difference calculating circuit for calculating a difference in level between the subject pixel data and the pixel data around the subject pixel data;

a mean value calculating circuit for calculating a mean value of the pixel data around the subject pixel data;

a comparing circuit for comparing the difference and the threshold to thereby determine which of the subject pixel data and the mean value should be used; and a switch for selecting either one of the subject pixel data and the mean value in accordance with a result of comparison output from said comparing circuit.

25. The device in accordance with claim 24, wherein said mean value calculating circuit multiplies each pixel data around the subject pixel data by a particular weighting coefficient on the basis of a position of the pixel data to thereby calculate the mean value.

* * * * *